United States Patent [19]
Carter

[11] 3,922,040
[45] Nov. 25, 1975

[54] HEAVY DUTY TRUNNION MOUNTING FOR AN EARTH MOVING VEHICLE

[76] Inventor: Lewis D. Carter, Riverside Road, Box 6, Korbel, Calif. 95550

[22] Filed: Mar. 25, 1974

[21] Appl. No.: 454,063

Related U.S. Application Data

[63] Continuation-in-part of Ser. No. 237,364, March 13, 1972, abandoned.

[52] U.S. Cl. .................... 308/72; 308/29; 172/803
[51] Int. Cl.² ........................................ F16C 25/00
[58] Field of Search ........ 308/72, 29; 172/803, 801, 172/802, 804, 805, 806

[56] References Cited
UNITED STATES PATENTS

| | | | |
|---|---|---|---|
| 1,838,582 | 12/1931 | Skillman | 308/72 |
| 2,003,080 | 5/1935 | Janson | 308/72 |
| 2,827,340 | 3/1958 | Johnson | 308/72 |
| 3,243,239 | 3/1966 | Hashmar | 308/72 |
| 3,339,988 | 9/1967 | Schultze | 308/72 |
| 3,464,747 | 9/1969 | Schmidt | 308/72 |
| 3,503,457 | 3/1970 | Smith | 172/803 |
| 3,512,815 | 5/1970 | Syra | 308/72 |
| 3,522,976 | 8/1970 | Spyra | 308/72 |
| 3,590,929 | 7/1971 | Wirt | 172/805 |
| 3,627,389 | 12/1971 | Foote | 308/72 |

*Primary Examiner*—Charles J. Myhre
*Assistant Examiner*—R. H. Lazarus
*Attorney, Agent, or Firm*—Melvin R. Stidham, Esq.

[57] ABSTRACT

The disclosure is of a heavy duty ball and socket trunnion for the working arms of an earth moving vehicle. There is a two-piece casing, each section with a recess to accommodate one segment of a split bearing, together forming a spherical bearing cavity. A pin which is to be welded to the frame of the vehicle carries a replaceable trunnion sleeve with a spherical outer surface complementary to that of the bearing. One section of the casing is to be welded to the end of the vehicle pusher arms. The casing completely encloses the bearing segments and the trunnion on at least three sides.

3 Claims, 5 Drawing Figures

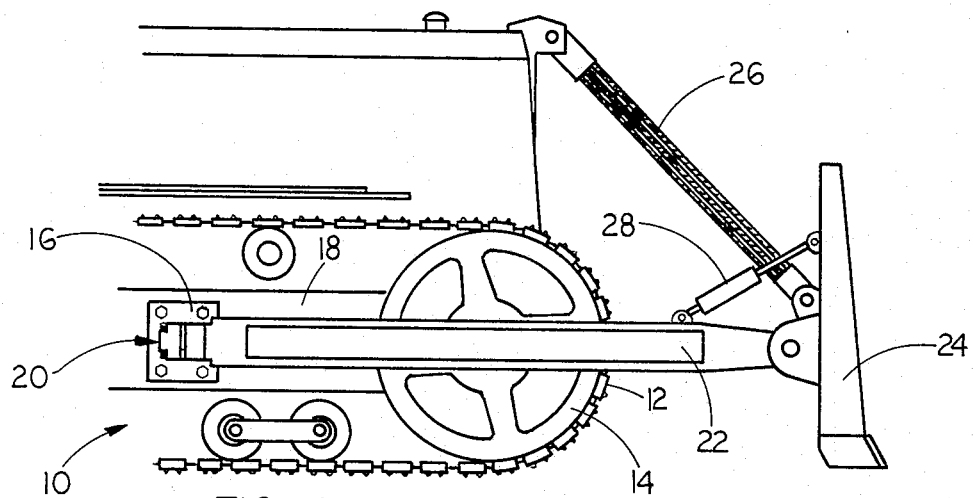
FIG.-1-
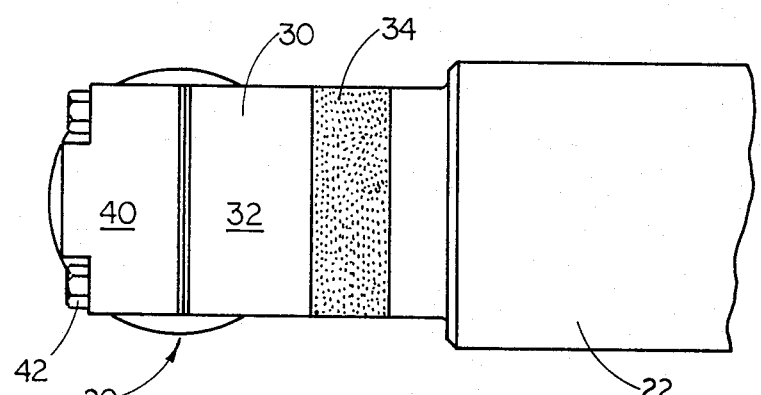
FIG.-2-
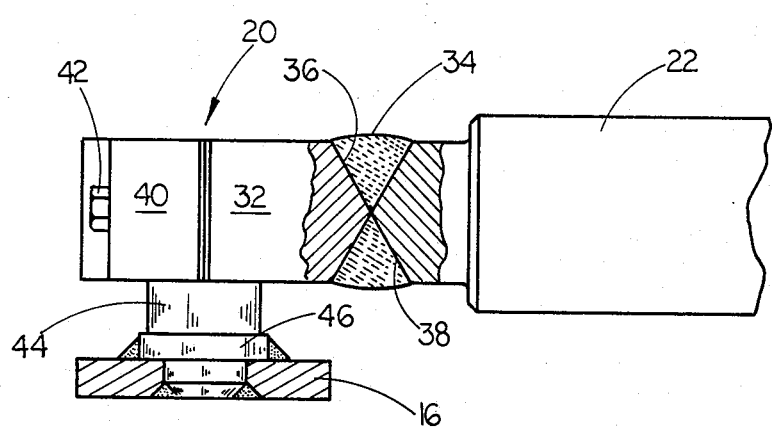
FIG.-3-

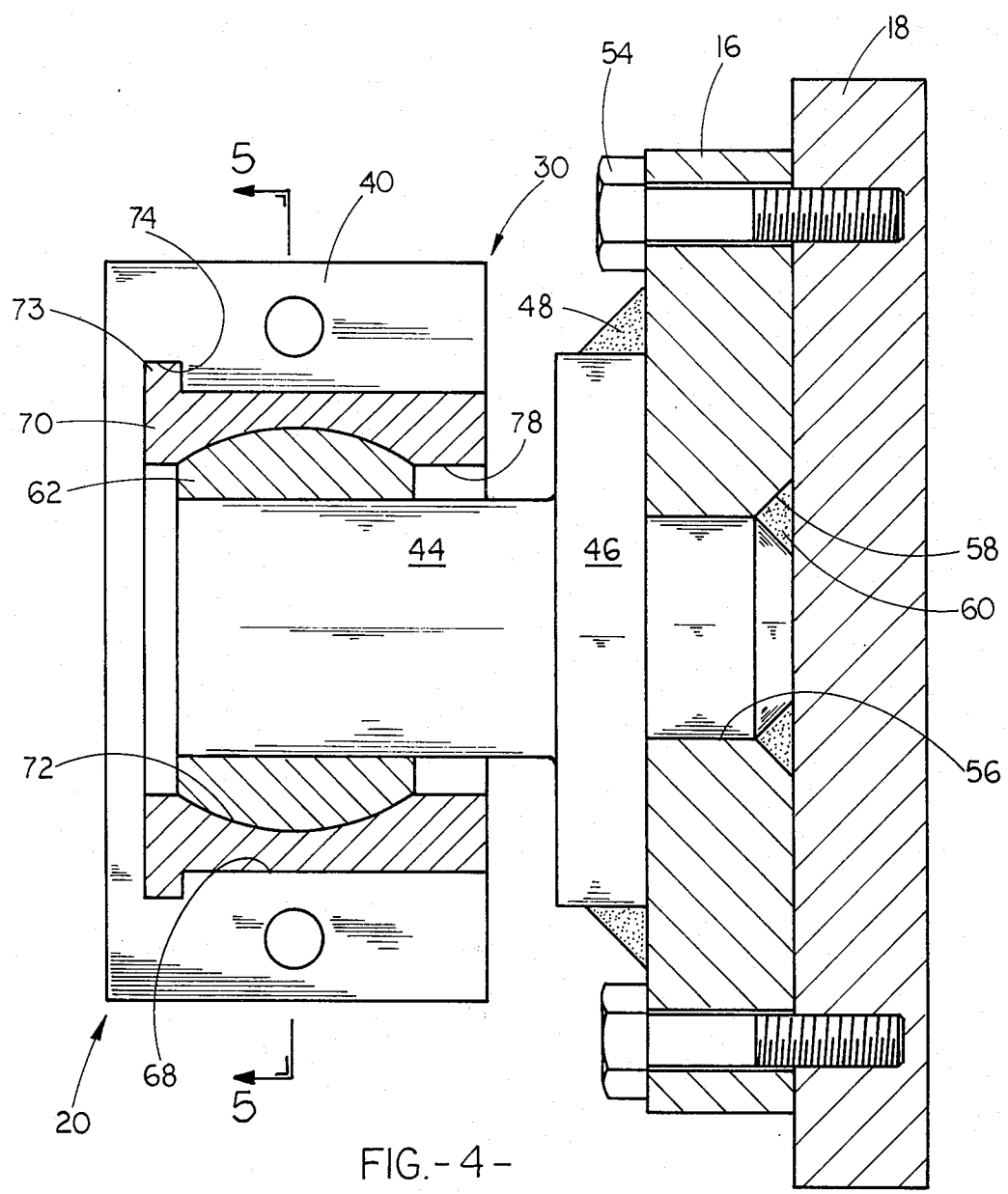
FIG.-4-

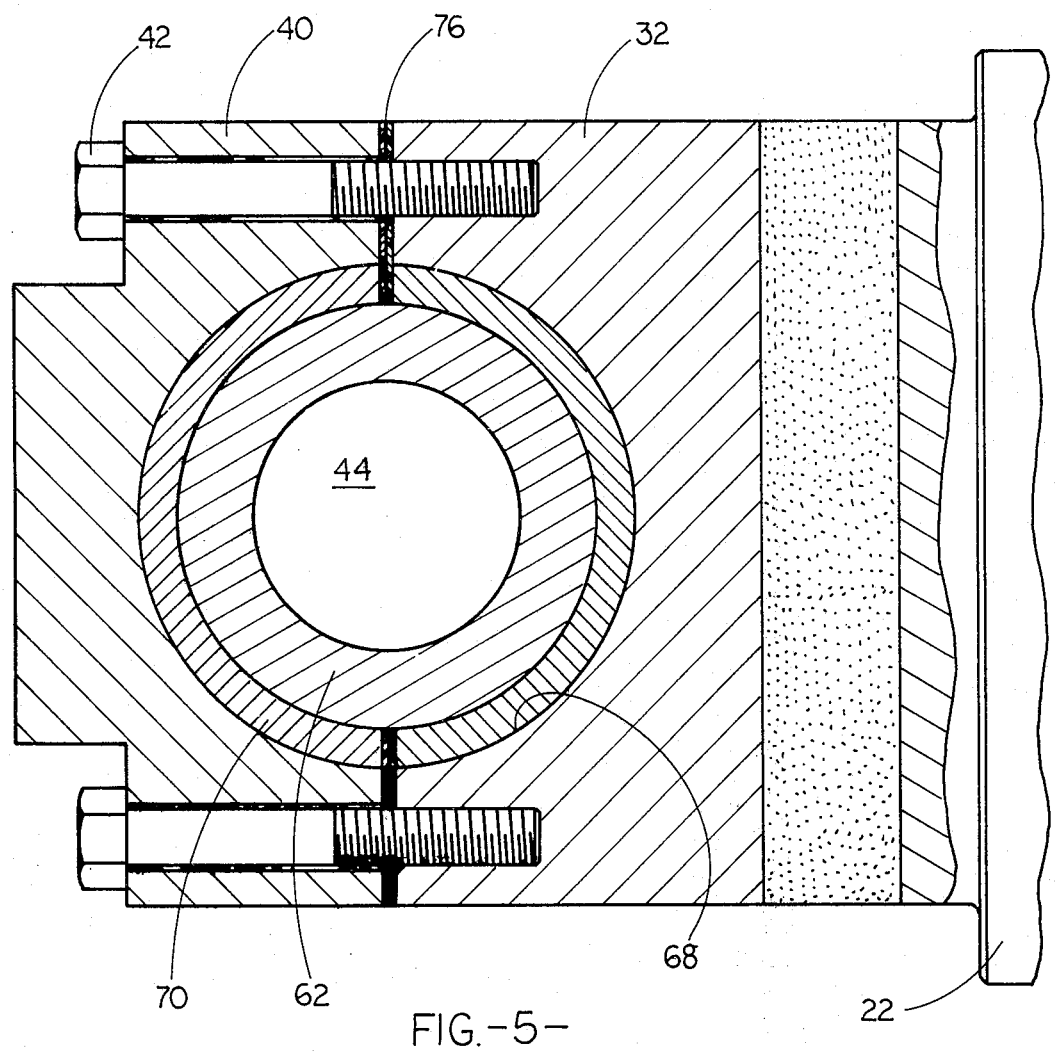
FIG.-5-

HEAVY DUTY TRUNNION MOUNTING FOR AN EARTH MOVING VEHICLE

RELATED APPLICATION

This application is a continuation-in-part of my co-pending application Ser. No. 237,364 filed Mar. 13, 1972, now abandoned, for "Heavy Duty Trunnion Mounting for Earth Moving Vehicle or The Like."

BACKGROUND OF THE INVENTION

Many earth moving vehicles, such as bulldozers, have a pair of pusher or working arms pivotally mounted on the vehicle to carry a dozer blade or other working implement. Conventionally, the pusher arms are pivoted on a ball and socket mounting with a solid ball welded to the vehicle frame and one-half of a two-piece socket bearing welded to the end of each pusher arm. When the ball is in place, the other half of the bearing assembly is bolted in place. This bearing assembly is, of course, subjected to heavy loads, and after a period of time, replacement is necessary. This requires that the ball trunnion be cut from the frame, as by torch cutting and that the bearing half be cut from each pusher arm. Then, new trunnions and bearing segments are welded to the vehicle frame and pusher arm, respectively. Such replacement parts are relatively expensive and the downtime required to effect the replacement is lengthy and costly.

OBJECTS OF THE INVENTION

It is an object of this invention to provide a heavy duty trunnion and bearing assembly for an earth moving vehicle which may be reconditioned at a minimum loss of time.

It is a further object of this invention to provide a heavy duty trunnion and bearing assembly with means for greatly protracting the life thereof.

It is a further object of this invention to provide a heavy duty trunnion and bearing assembly for an earth moving vehicle wherein the parts subject to wear may be replaced quickly.

It is a fruther object of this invention to provide a heavy duty trunnion and bearing assembly for an earth moving vehicle wherein the parts subject to wear may be replaced without removing the vehicle from the location in which it is being worked.

It is a further object of this invention to provide a heavy duty trunnion and bearing assembly for an earth moving vehicle which assembly is protected against abrasion by dirt and other foreign particles.

Other objects and advantages of this invention will become apparent from the description to follow when read in conjunction with the accompanying drawings.

BRIEF SUMMARY OF THE INVENTION

The one-piece ball of the conventional mounting is replaced by a pin with a removable trunnion sleeve, which has a spherical outer surface, securely mounted thereon as by shrinkfitting it into place. A two-piece bearing, with the two bearing segments together forming a spherical inner surface complementary to that of the trunnion sleeve is almost wholly enclosed with a two-piece casing. One section of the casing is welded to the end of a pusher arm. Hence, a bearing segment is placed in the fixed casing section and, after the trunnion is placed therein, the other casing sections with a bearing segment in place, is bolted to it. Wear shims are provided between the casing and bearing sections, to hold the bearing segment against rotation in the closed casing. The bearing segments are interchangeable so that the forward segment which takes the thrust from the working implement through the pusher arms, may be switched with the rear segment to prolong bearing life.

BRIEF DESCRIPTION OF THE DRAWINGS

In the drawings:

FIG. 1 shows a partial side view of a tractor with a bulldozer attachment;

FIG. 2 is an enlarged top view of the trunnion mounting for the bulldozer pusher arm;

FIG. 3 is a top view of the trunnion mounting;

FIG. 4 is an enlarged section view of the trunnion mounting; and

FIG. 5 is a section view taken along Line 5—5 of FIG. 4.

DESCRIPTION OF A PREFERRED EMBODIMENT

Referring more particularly to FIGS. 1, 2 and 3, there is shown a typical tractor vehicle 10 with endless track drive 12 carried on sprocket type wheels 14. Pivotally mounted on a support plate 16 secured to the frame 18 is a trunnion mounting 20 for the pusher arms 22 of an earth moving member, such as the dozer blade 24 shown. The blade may be raised and lowered by means of hydraulic rams 26 linked between the vehicle 10 and the blade 24 and bracing links 28 are connected between each pusher arm 22 and the corresponding side of the blade 24.

Referring now to FIGS. 2 and 3, the trunnion assembly 20 includes a two-part bolted casing 30. One of the casing sections 32 is welded at 34 to the end of the pusher arm 22 so as to be made integral therewith. Prior to welding, both the casing section 32 and the end of the pusher arm 22 are preferably chamfered at 36 and 38 to facilitate welding. The other casing section 40 is secured to the pusher arm casing section 32 as by means of bolts 42.

Now, referring more specifically to FIGS. 4 and 5, the trunnion mounting 20 includes a pin 44 on which is carried a flange or collar 46, which is welded at 48 to the mounting plate 16 which in turn is secured to the vehicle frame 18 as by means of bolts 54. The pin 44 is received in an opening 56 in the mounting plate 16 and may be tapered at the end in order to facilitate welding 60. Carried on the pin 44 and held firmly in place, as by means of a shrink-fit, is a spherical trunnion sleeve 62.

Removably carried within a recess 68 in each section 32 and 40 of the casing 30 is a semi-circular bearing segment 70 with a spherical inner surface 72 complementary to the outer spherical surface of the trunnion sleeve 62. A retainer flange 73 on each bearing segment is received in an accommodating groove 74 in the recess 68 to prevent lateral displacement. A bearing 70 is placed in each section 32 and 40 and after the trunnion sleeve 62 and bearing segments are in place, the casing section 40 is bolted at 42 to the pusher arm section 32. Prior to bolting the two casing sections together, one or more shim plates 76 (FIG. 5) of closed rectangular configuration are placed between the mating surfaces 80 of the casing sections and between the bearing segments 70 in order to absorb some wear and to hold in bearing segments 70 non-rotatably in its casing section.

It will be noted that the casing sections 32 and 40 encase the trunnion and bearing on the outboard side and completely around it. Any small amount of dirt which may enter through the inboard side 78 is generally wiped away as the bearing segments 70 rock on the trunnion 62.

In operation, after the trunnion sleeve 62 and/or bearing segments 70 have experienced some wear, the resultant sloppy fit may be remedied in the field simply by removal of one or more shims 78. Thereafter, in the event of further wear, the forward bearing segment 70, which carries the bulk of the load, may be interchanged with the rear bearing segment in order to prolong the life of the assembly further. When excessive wear finally occurs, it is merely necessary to remove the bolts 42 and separate the casing sections 32 and 40 for removal of the bearing segments 70, and, if necessary, the trunnion sleeve 62. A replacement sleeve is expanded by heating and shrunk fit onto the pin 44. Then, with new bearing components in place, the units may be reassembled and placed into use with a minimum of downtime. There is no need to cut either the pin 44 from the mounting plate or the casing section 32 from the pusher arm.

While this invention has been described in conjunction with preferred embodiments thereof, it is obvious that modifications and changes therein may be made by those skilled in the art without departing from the spirit and scope of the invention.

What is claimed is:

1. In an earth moving vehicle having load transmitting pusher arms which are pivotable through a limited arc and having a working implement attached to the ends thereof, the improvement comprising: a heavy duty trunnion mounting for each of said arms including
   a pin;
   mounting means for securing said pin to the frame of said vehicle;
   an annular trunnion member having a spherical outer surface immovably carried on said pin;
   a casing in two sections;
   each section of said casing having a recess therein and a planar mating surface extending on two sides parallel to said pin and on an outboard intermediate side along a diameter of said pin;
   one section of said casing being adapted to be welded to the end of a load transmitting pusher arm with the mating surface thereof transverse to the length of an arm;
   a one-half bearing member segment interchangeably and removably received in each of said recesses;
   a spherical surface on each of said bearing members complementary to and adapted to receive said trunnion sleeve;
   at least one shim engaged between said mating surfaces and said bearing segments holding each of said segments nonrotatably in its casing section recess; and means for securing the sections of said casing together.

2. The trunnion mounting defined by claim 1 wherein:
   said trunnion member is a sleeve shrink fit on said pin.

3. The trunnion mounting defined by claim 1 wherein:
   each of said bearing segments may be received in the recess of either of said casing sections.

* * * * *